US012490882B2

(12) United States Patent
Akahane et al.

(10) Patent No.: US 12,490,882 B2
(45) Date of Patent: Dec. 9, 2025

(54) IMAGING ELEMENT, ENDOSCOPE, ENDOSCOPE SYSTEM, AND TESTING METHOD

(71) Applicant: OLYMPUS CORPORATION, Hachioji (JP)

(72) Inventors: Nana Akahane, Hachioji (JP); Masashi Saito, Hachioji (JP); Takeshi Doh, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 697 days.

(21) Appl. No.: 17/957,013

(22) Filed: Sep. 30, 2022

(65) Prior Publication Data

US 2023/0024742 A1    Jan. 26, 2023

Related U.S. Application Data

(63) Continuation of application No. PCT/JP2020/015383, filed on Apr. 3, 2020.

(51) Int. Cl.
*A61B 1/00* (2006.01)
*A61B 1/05* (2006.01)

(52) U.S. Cl.
CPC ...... *A61B 1/00006* (2013.01); *A61B 1/00027* (2013.01); *A61B 1/05* (2013.01)

(58) Field of Classification Search
CPC ..... A61B 1/00006; A61B 1/045; A61B 1/051; A61B 1/00027; A61B 1/05; H04N 25/76; H04N 5/04; H10F 39/809

(Continued)

(56) References Cited

U.S. PATENT DOCUMENTS 5,006,728 A * 4/1991 Yonekura .................. G06F 1/26
327/392
8,553,077 B2 * 10/2013 Ozawa .................... A61B 1/063
600/178

(Continued)

FOREIGN PATENT DOCUMENTS

CN    207456473 U  *  6/2018
JP    H1166944 A  *  3/1999

(Continued)

OTHER PUBLICATIONS

International Search Report dated Jul. 7, 2020, issued in counterpart International Application No. PCT/JP2020/015383 (2 pages).

*Primary Examiner* — David Q Nguyen
(74) *Attorney, Agent, or Firm* — WHDA, LLP

(57) ABSTRACT

An imaging element includes: a pixel board including a light receiver including plural pixels, each pixel being configured to generate an imaging signal; a circuit board including a functional circuit, the pixel board being layered on the circuit board; plural wiring portions configured to electrically connect the pixel board and the circuit board to each other and electrically transmit signals between respective layers; a terminal provided on the circuit board, the terminal being electrically connected to each of the plural wiring portions, the terminal being configured to output the imaging signal to an outside of the terminal or receive an external signal from the outside of the terminal; and a switch configured to output, by selective switching, at least one of the imaging signal and an internal signal generated at the circuit board, to the terminal.

15 Claims, 16 Drawing Sheets

(58) Field of Classification Search
USPC .......................................... 348/68; 327/392
See application file for complete search history.

(56) References Cited

U.S. PATENT DOCUMENTS

| | | | |
|---|---|---|---|
| 11,062,666 B2 * | 7/2021 | Kurokawa | ........... G09G 3/3677 |
| 2017/0033144 A1 | 2/2017 | Takahashi | |
| 2018/0331147 A1 | 11/2018 | Takahashi | |
| 2019/0037155 A1 | 1/2019 | Tanaka et al. | |
| 2019/0096948 A1 | 3/2019 | Masuda et al. | |
| 2020/0185449 A1 | 6/2020 | Takahashi | |
| 2020/0251519 A1 | 8/2020 | Masuda et al. | |
| 2021/0313375 A1 | 10/2021 | Masuda et al. | |

FOREIGN PATENT DOCUMENTS

| | | | | |
|---|---|---|---|---|
| JP | 2017-175047 A | | 9/2017 | |
| TW | 200947410 A | * | 11/2009 | ............... G09G 3/36 |
| WO | 2015/159766 A1 | | 10/2015 | |
| WO | 2017/187738 A1 | | 11/2017 | |

* cited by examiner

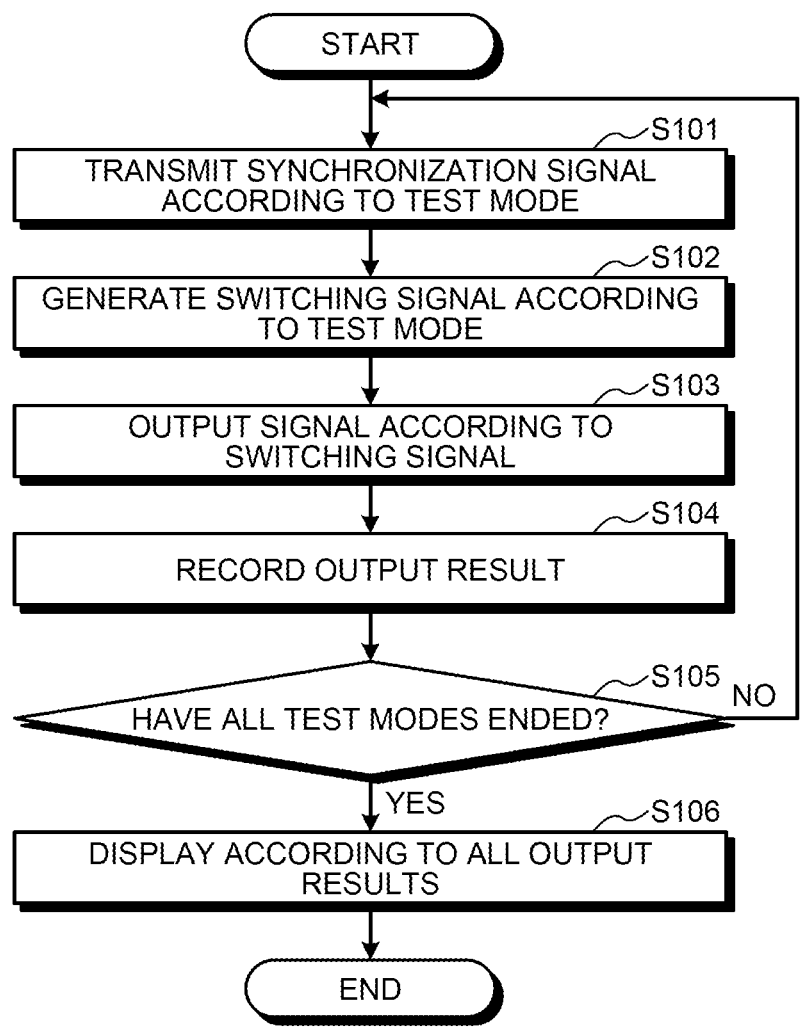

FIG.6

| TEST MODE | FIRST TEST MODE | | SECOND TEST MODE | | THIRD TEST MODE | |
|---|---|---|---|---|---|---|
| OUTPUT SIGNAL | $V_{OUT}$ | | DC1 | | SYNC | |
| DETERMINATION | GOOD | NOT GOOD | GOOD | NOT GOOD | GOOD | NOT GOOD |
| STATE | LAYER CONNECTION: GOOD PERIPHERAL CIRCUIT: GOOD IMAGER: GOOD | LAYER CONNECTION: NOT GOOD PERIPHERAL CIRCUIT: NOT GOOD IMAGER: NOT GOOD | LAYER CONNECTION: PERIPHERAL CIRCUIT: GOOD IMAGER: | LAYER CONNECTION: PERIPHERAL CIRCUIT: NOT GOOD IMAGER: | LAYER CONNECTION: PERIPHERAL CIRCUIT: GOOD IMAGER: | LAYER CONNECTION: PERIPHERAL CIRCUIT: NOT GOOD IMAGER: |

FIG.7

| | 1 | 2 | 3 | 4 | 5 | 6 | 7 | 8 |
|---|---|---|---|---|---|---|---|---|
| FIRST TEST MODE | GOOD | GOOD | GOOD | GOOD | NOT GOOD | NOT GOOD | NOT GOOD | NOT GOOD |
| SECOND TEST MODE | GOOD | GOOD | NOT GOOD | NOT GOOD | GOOD | GOOD | NOT GOOD | NOT GOOD |
| THIRD TEST MODE | GOOD | NOT GOOD | GOOD | NOT GOOD | GOOD | NOT GOOD | GOOD | NOT GOOD |
| DETERMINATION RESULTS | LAYER CONNECTION: GOOD / PERIPHERAL CIRCUIT: GOOD / IMAGING ELEMENT: GOOD | LAYER CONNECTION: GOOD / PERIPHERAL CIRCUIT: NOT GOOD / SWITCH OR FIRST GENERATOR / IMAGING ELEMENT: GOOD | LAYER CONNECTION: GOOD / PERIPHERAL CIRCUIT: NOT GOOD / SWITCH OR FIRST GENERATOR / IMAGING ELEMENT: GOOD | LAYER CONNECTION: GOOD / PERIPHERAL CIRCUIT: NOT GOOD / SWITCH OR FIRST GENERATOR / IMAGING ELEMENT: GOOD | LAYER CONNECTION: NOT GOOD / PERIPHERAL CIRCUIT: GOOD / IMAGING ELEMENT: NOT GOOD | LAYER CONNECTION: NOT GOOD / PERIPHERAL CIRCUIT: NOT GOOD / SEPARATOR / IMAGING ELEMENT: NOT GOOD | LAYER CONNECTION: NOT GOOD / PERIPHERAL CIRCUIT: NOT GOOD / SEPARATOR / IMAGING ELEMENT: NOT GOOD | LAYER CONNECTION: NOT GOOD / PERIPHERAL CIRCUIT: NOT GOOD / SWITCH OR FIRST GENERATOR OR SEPARATOR / IMAGING ELEMENT: NOT GOOD |

FIG.16

| TEST MODE | FIRST TEST MODE | SECOND TEST MODE | THIRD TEST MODE | FOURTH TEST MODE | FIFTH TEST MODE | SIXTH TEST MODE | SEVENTH TEST MODE |
|---|---|---|---|---|---|---|---|
| OUTPUT SIGNAL FROM FIRST SEMI-CONDUCTOR BOARD | $V_{OUT}$ | CLK | SYNC | $V_{OUT}$ | | | |
| OUTPUT SIGNAL FROM SECOND SEMI-CONDUTOR BOARD | $V_{OUT}$ | $V_{OUT}$ | $V_{OUT}$ | CLK | SYNC | $V_{OUT}$ | $V_{OUT}$ |
| OUTPUT SIGNAL FROM IMAGING ELEMENT | $V_{OUT}$ | $V_{OUT}$ | $V_{OUT}$ | $V_{OUT}$ | $V_{OUT}$ | CLK | SYNC |
| DETERMINA-TION | GOOD / NOT GOOD | GOOD / NOT GOOD | GOOD / NOT GOOD | GOOD / NOT GOOD | GOOD / NOT GOOD | GOOD / NOT GOOD | GOOD / NOT GOOD |
| STATE | CONNECTION BETWEEN PERIPHERAL CIRCUIT AND CAPACITOR CHIP: GOOD / CONNECTION BETWEEN CAPACITOR CHIP AND IMAGER: GOOD / PERIPHERAL CIRCUIT: GOOD / FIRST SEMI-CONDUCTOR BOARD: GOOD / IMAGING ELEMENT: GOOD — CONNECTION BETWEEN PERIPHERAL CIRCUIT AND CAPACITOR CHIP: NOT GOOD / CONNECTION BETWEEN CAPACITOR CHIP AND IMAGER: NOT GOOD / PERIPHERAL CIRCUIT: NOT GOOD / SECOND SEMI-CONDUCTOR BOARD: NOT GOOD / IMAGING ELEMENT: NOT GOOD | CONNECTION BETWEEN PERIPHERAL CIRCUIT AND CAPACITOR CHIP: NOT GOOD / CONNECTION BETWEEN CAPACITOR CHIP AND IMAGER: NOT GOOD / PERIPHERAL CIRCUIT: NOT GOOD / SECOND SEMI-CONDUCTOR BOARD: NOT GOOD / IMAGING ELEMENT: NOT GOOD — CONNECTION BETWEEN PERIPHERAL CIRCUIT AND CAPACITOR CHIP: NOT GOOD / CONNECTION BETWEEN CAPACITOR CHIP AND IMAGER: NOT GOOD / PERIPHERAL CIRCUIT: NOT GOOD / SECOND SEMI-CONDUCTOR BOARD: NOT GOOD / IMAGING ELEMENT: NOT GOOD | CONNECTION BETWEEN PERIPHERAL CIRCUIT AND CAPACITOR CHIP: GOOD / CONNECTION BETWEEN CAPACITOR CHIP AND IMAGER: GOOD / PERIPHERAL CIRCUIT: GOOD / SECOND SEMI-CONDUCTOR BOARD: GOOD / IMAGING ELEMENT: NOT GOOD — CONNECTION BETWEEN PERIPHERAL CIRCUIT AND CAPACITOR CHIP: NOT GOOD / CONNECTION BETWEEN CAPACITOR CHIP AND IMAGER: NOT GOOD / PERIPHERAL CIRCUIT: NOT GOOD / SECOND SEMI-CONDUCTOR BOARD: NOT GOOD / IMAGING ELEMENT: NOT GOOD | CONNECTION BETWEEN PERIPHERAL CIRCUIT AND CAPACITOR CHIP: GOOD / CONNECTION BETWEEN CAPACITOR CHIP AND IMAGER: NOT GOOD / PERIPHERAL CIRCUIT: GOOD / SECOND SEMI-CONDUCTOR BOARD: GOOD / IMAGING ELEMENT: NOT GOOD — CONNECTION BETWEEN PERIPHERAL CIRCUIT AND CAPACITOR CHIP: NOT GOOD / CONNECTION BETWEEN CAPACITOR CHIP AND IMAGER: NOT GOOD / PERIPHERAL CIRCUIT: NOT GOOD / SECOND SEMI-CONDUCTOR BOARD: NOT GOOD / IMAGING ELEMENT: NOT GOOD | CONNECTION BETWEEN PERIPHERAL CIRCUIT AND CAPACITOR CHIP: GOOD / CONNECTION BETWEEN CAPACITOR CHIP AND IMAGER: NOT GOOD / PERIPHERAL CIRCUIT: GOOD / SECOND SEMI-CONDUCTOR BOARD: GOOD / IMAGING ELEMENT: NOT GOOD — CONNECTION BETWEEN PERIPHERAL CIRCUIT AND CAPACITOR CHIP: NOT GOOD / CONNECTION BETWEEN CAPACITOR CHIP AND IMAGER: NOT GOOD / PERIPHERAL CIRCUIT: NOT GOOD / SECOND SEMI-CONDUCTOR BOARD: NOT GOOD / IMAGING ELEMENT: NOT GOOD | CONNECTION BETWEEN PERIPHERAL CIRCUIT AND CAPACITOR CHIP: GOOD / CONNECTION BETWEEN CAPACITOR CHIP AND IMAGER: GOOD / PERIPHERAL CIRCUIT: GOOD / SECOND SEMI-CONDUCTOR BOARD: GOOD / IMAGING ELEMENT: NOT GOOD — CONNECTION BETWEEN PERIPHERAL CIRCUIT AND CAPACITOR CHIP: NOT GOOD / CONNECTION BETWEEN CAPACITOR CHIP AND IMAGER: NOT GOOD / PERIPHERAL CIRCUIT: NOT GOOD / FIRST SEMI-CONDUCTOR BOARD: NOT GOOD / IMAGING ELEMENT: NOT GOOD | CONNECTION BETWEEN PERIPHERAL CIRCUIT AND CAPACITOR CHIP: GOOD / CONNECTION BETWEEN CAPACITOR CHIP AND IMAGER: GOOD / PERIPHERAL CIRCUIT: GOOD / CAPACITOR CHIP: GOOD / IMAGING ELEMENT: NOT GOOD — CONNECTION BETWEEN PERIPHERAL CIRCUIT AND CAPACITOR CHIP: NOT GOOD / CONNECTION BETWEEN CAPACITOR CHIP AND IMAGER: NOT GOOD / PERIPHERAL CIRCUIT: NOT GOOD / SECOND SEMI-CONDUCTOR BOARD: NOT GOOD / IMAGING ELEMENT: NOT GOOD |

FIG.17

| | 1 | 2 | 3 | 4 | 5 | ... | 127 | 128 |
|---|---|---|---|---|---|---|---|---|
| FIRST TEST MODE | GOOD | NOT GOOD | GOOD | NOT GOOD | GOOD | | GOOD | NOT GOOD |
| SECOND TEST MODE | GOOD | GOOD | NOT GOOD | GOOD | GOOD | | NOT GOOD | NOT GOOD |
| THIRD TEST MODE | GOOD | GOOD | GOOD | GOOD | NOT GOOD | | NOT GOOD | NOT GOOD |
| FOURTH TEST MODE | GOOD | GOOD | GOOD | GOOD | GOOD | | NOT GOOD | NOT GOOD |
| FIFTH TEST MODE | GOOD | GOOD | GOOD | GOOD | GOOD | | NOT GOOD | NOT GOOD |
| SIXTH TEST MODE | GOOD | GOOD | GOOD | GOOD | GOOD | | NOT GOOD | NOT GOOD |
| SEVENTH TEST MODE | CONNECTION BETWEEN PERIPHERAL CIRCUIT AND CAPACITOR CHIP: GOOD / CONNECTION BETWEEN CAPACITOR CHIP AND IMAGER: GOOD / PERIPHERAL CIRCUIT: GOOD | CONNECTION BETWEEN PERIPHERAL CIRCUIT AND CAPACITOR CHIP: GOOD / CONNECTION BETWEEN CAPACITOR CHIP AND IMAGER: GOOD / PERIPHERAL CIRCUIT: NOT GOOD | CONNECTION BETWEEN PERIPHERAL CIRCUIT AND CAPACITOR CHIP: GOOD / CONNECTION BETWEEN CAPACITOR CHIP AND IMAGER: GOOD / PERIPHERAL CIRCUIT: NOT GOOD / SWITCHING CIRCUIT OR SWITCHING SIGNAL GENERATION | CONNECTION BETWEEN PERIPHERAL CIRCUIT AND CAPACITOR CHIP: GOOD / CONNECTION BETWEEN CAPACITOR CHIP AND IMAGER: GOOD / PERIPHERAL CIRCUIT: NOT GOOD / SWITCHING CIRCUIT OR SWITCHING SIGNAL GENERATION | CONNECTION BETWEEN PERIPHERAL CIRCUIT AND CAPACITOR CHIP: GOOD / CONNECTION BETWEEN CAPACITOR CHIP AND IMAGER: GOOD / PERIPHERAL CIRCUIT: NOT GOOD / SWITCHING CIRCUIT OR SWITCHING SIGNAL GENERATION | | CONNECTION BETWEEN PERIPHERAL CIRCUIT AND CAPACITOR CHIP: GOOD / CONNECTION BETWEEN CAPACITOR CHIP AND IMAGER: GOOD / PERIPHERAL CIRCUIT: NOT GOOD / SWITCHING CIRCUIT OR SWITCHING SIGNAL GENERATION NOT GOOD | CONNECTION BETWEEN PERIPHERAL CIRCUIT AND CAPACITOR CHIP: NOT GOOD / CONNECTION BETWEEN CAPACITOR CHIP AND IMAGER: NOT GOOD / PERIPHERAL CIRCUIT: NOT GOOD |
| DETERMINATION RESULTS | CAPACITOR CHIP: GOOD / IMAGER: GOOD | CAPACITOR CHIP: GOOD / IMAGER: NOT GOOD | CAPACITOR CHIP: GOOD / IMAGER: GOOD | CAPACITOR CHIP: GOOD / IMAGER: NOT GOOD | CAPACITOR CHIP: GOOD / IMAGER: GOOD | | CAPACITOR CHIP: NOT GOOD / IMAGER: GOOD SWITCHING CIRCUIT OR SWITCHING SIGNAL GENERATION NOT GOOD | CAPACITOR CHIP: NOT GOOD / IMAGER: |

IMAGING ELEMENT, ENDOSCOPE, ENDOSCOPE SYSTEM, AND TESTING METHOD

CROSS-REFERENCE TO RELATED APPLICATION

This application is a continuation of International Application No. PCT/JP2020/015383, filed on Apr. 3, 2020, the entire contents of which are incorporated herein by reference.

BACKGROUND

1. Technical Field

The present disclosure relates to an imaging element, an endoscope, an endoscope system, and a to method, for generation of image data by imaging of a subject.

2. Related Art

In the related art, a known technique adopted for solid-state imaging devices involves layering, over one another: a first semiconductor board including a sensor circuit including a photoelectric converter; and a second semiconductor board and a third semiconductor board each including a circuit different from the sensor circuit (for example, see International Publication No. 2015/159766). In this technique, interlayer connection between the semiconductor boards is achieved by use of plural electrodes and/or bumps, for example, and signals are thereby input and output between the semiconductor boards. Furthermore, every time one of the semiconductor boards is layered over another one of the semiconductor boards, energization states of the electrodes are tested by predetermined measurement.

SUMMARY

In some embodiments, an imaging element includes: a pixel board including a light receiver arranged on the pixel board, the light receiver including plural pixels that are arranged in a two-dimensional matrix, each pixel being configured to receive light from an outside of the pixel and generate an imaging signal according to quantity of the light received; a circuit board including a functional circuit with a predetermined function, the pixel board being layered on the circuit board; plural wiring portions configured to electrically connect the pixel board and the circuit board to each other and electrically transmit signals between respective layers; a terminal provided on the circuit board, the terminal being electrically connected to each of the plural wiring portions, the terminal being configured to output the imaging signal to an outside of the terminal or receive an external signal from the outside of the terminal; and a switch configured to output, by selective switching, at least one of the imaging signal and an internal signal generated at the circuit board, to the terminal.

In some embodiments, all endoscope includes: the imaging element; and an insertion portion, that to be inserted into a subject, the insertion portion including the imaging element provided at a distal end portion of the insertion portion.

In some embodiments, provided is a testing method of an imaging element including: a pixel board including a light receiver arranged on the pixel board, the light receiver including plural pixels that are arranged in a two-dimensional matrix, each pixel being configured to receive light from an outside, of the pixel and generate an imaging signal according to quantity of the light received; a circuit board including a functional circuit with a predetermined function, the pixel board being layered on the circuit board; plural wiring portions configured to electrically connect the pixel board and the circuit board to each other and electrically transmit signals between respective layers; a terminal provided on the circuit board, the terminal being electrically connected to each of the plural wiring portions, the terminal being configured to output the imaging signal to an outside of the terminal or receive an external signal from the outside of the terminal; and a switch configured to output, by selective switching, at least one of the imaging signal and an internal signal generated at the circuit board, to the terminal, the testing method including: inputting at least a synchronization signal to the imaging element; and determining a defective part of the imaging element based on the imaging signal and the internal signal output from the imaging element.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 5 is a flowchart illustrating an outline of a testing method executed in the endoscope system according to the first embodiment;

FIG. 6 is a diagram illustrating correspondence between tests modes, output signals output from the imaging element, determination results, and state results indicating states of the imaging element, according to the first embodiment;

FIG. 7 is a diagram associating between the test modes, the determination results, and defective part a that are able to be presumed to be defective from the determination results, according to the first embodiment;

FIG. 16 is a diagram illustrating correspondence between test modes, output signals output from the imaging element, determination results, and state results indicating states of the imaging element, according to the seventh embodiment; and FIG. 17 is a diagram associating between the test modes, the determination results, and defective parts that are able to be presumed to be defective from the determination results, according to the seventh embodiment.

DETAILED DESCRIPTION

Modes for implementing the present disclosure (hereinafter, referred to as "embodiments") described hereinafter are endoscope systems each including an imaging device. These embodiments do not limit the disclosure. Any portions that are the same will be assigned with the same reference sign throughout the drawings. The drawings are schematic, and it needs to be noted that relations between thicknesses and widths of members and ratios among the members therein may be different from the actual ones. A portion that differs in dimensions and ratios among the drawings may also be included.

First Embodiment

Configuration of Endoscope System

Figure 1:
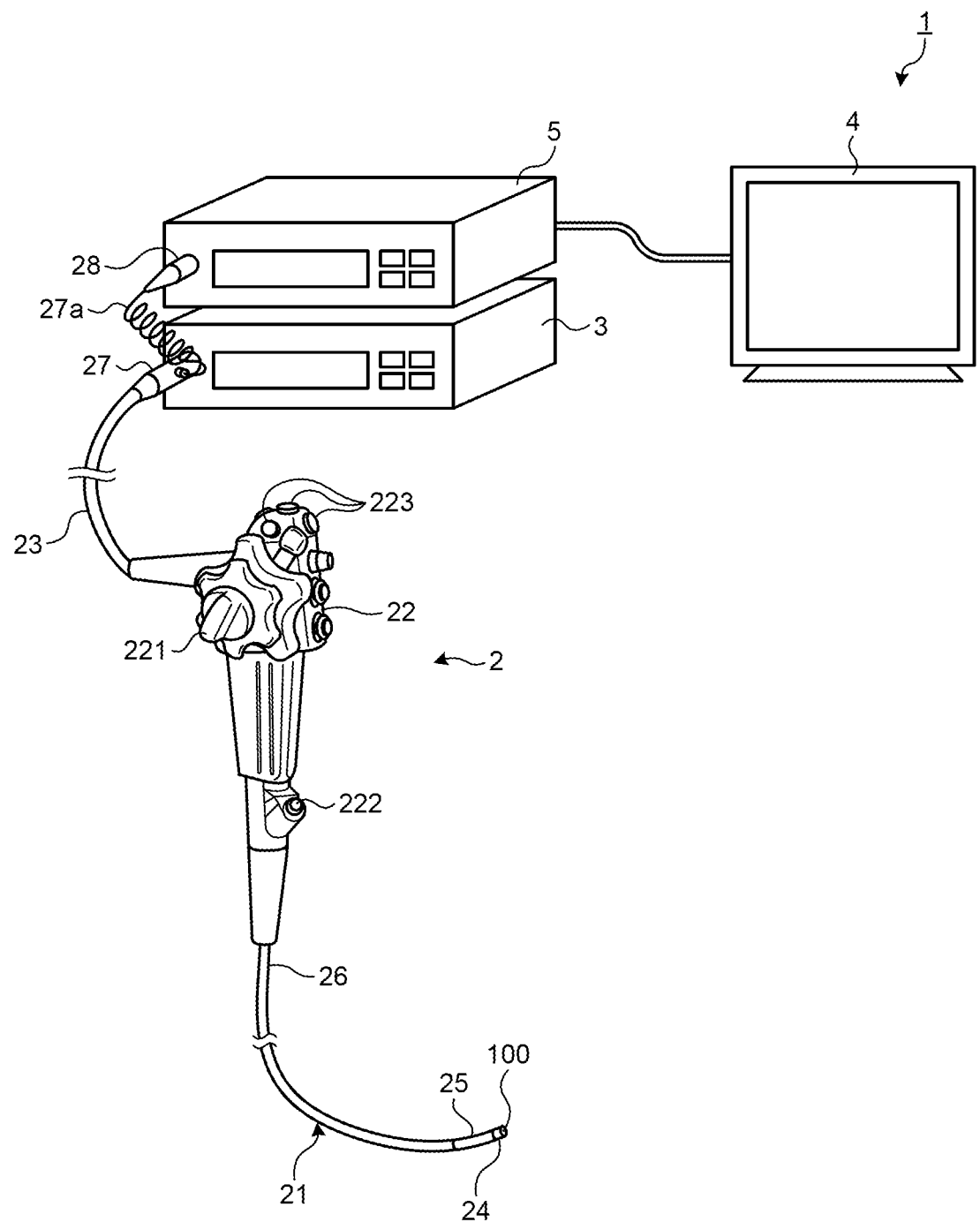
FIG. 1 is a diagram schematically illustrating an overall configuration of an endoscope system according to a first embodiment.

FIG. 1 is a diagram schematically illustrating an overall configuration of an endoscope system according to a first embodiment. In an endoscope system 1 illustrated in FIG. 1, images of the interior of the body of a subject, such as a patient, are captured by insertion of an insertion portion of an endoscope into the subject, and display images based on imaging signals captured thereby are displayed on a display device. A user, such as a medical doctor, performs observation of the display images displayed on the display device. The endoscope system 1 includes an endoscope 2, a light source device 3, a display device 4, and a control device 5.

Configuration of Endoscope

A configuration of the endoscope 2 will be described first.

The endoscope 2 generates an imaging signal (RAW data) resulting from imaging of the interior of the body of a subject, and outputs the generated imaging signal to the control device 5. The endoscope 2 includes an insertion portion 21, an operating unit 22, and a universal cord 23.

The insertion portion 21 is inserted into a subject. The insertion portion 21 has an elongated shape having flexibility. The insertion portion 21 includes: a distal end portion 24 including therein an imaging device 100 described later; a bending portion 25 that is formed of plural bending pieces and is bendable; and a flexible tube portion 26 that is connected to a proximal end of the bending portion 25, has flexibility, and is elongated.

The distal end portion 24 is formed by use of, for example, glass fiber. The distal end portion 24 includes: a light guide (not illustrated in the drawings) forming a light guiding path for illumination light supplied from the light source device 3; an illumination optical system provided at a distal end of the light guide; and the imaging device 100 described later.

The operating unit 22 includes: a bending knob 221 that bends the bending portion 25 upward, downward, leftward, and/or rightward; a treatment tool insertion portion 222 through which a treatment tool, such as biopsy forceps, an electric knife, or an examination probe, are/is inserted into a body cavity; and plural switches 223 serving as an operation input unit through which peripheral device operating instruction signals and a pre-freeze signal are input, the peripheral device operating instruction signals being for, in addition to the light source device 3 and the control device 5, peripheral devices, such as an air feeding means, a water feeding means, and a gas feeding means, the pre-freeze signal being for instructing the imaging device 100 to rapture a still image. The treatment tool inserted from the treatment tool insertion portion 222 comes out from an opening (not illustrated in the drawings) via a treatment tool channel (not illustrated in the drawings) in the distal end portion 24.

The universal cord 23 includes therein at least the light guide and a cable assembly including one or plural cables bundled together. The cable assembly includes signal lines for transmitting and receiving signals between: the endoscope 2 and the light source device 3; and the control device 5. These signal lines include, for example, a signal line for transmitting and receiving captured images (image data), a signal line for transmitting and receiving drive timing signals (synchronization signals and clock signals) for driving the imaging device 100, and a signal line for supplying electric power to the imaging device 100. The universal cord 23 includes a connector 27 that is attachable to and detachable from the light source device 3. A coil cable 27a that is coil-shaped extends from the connector 27. A connector 28 attachable to and detachable from the control device 5 is provided at an extended end of the coil cable 27a.

Configuration of Light Source Device

A configuration of the light source device 3 will be described next.

Under control by the control device 5, the light source device 3 supplies illumination light with which the endoscope 2 irradiates a subject. The light source device 3 is implemented by use of, for example, a halogen lamp, a laser diode (LD), and a white light emitting diode (LED). The light source device 3 supplies the illumination light to the distal end portion 24 of the insertion portion 21, via the connector 27, the universal cord 23, and the insertion portion 21. The illumination light is any one of white light and special light (for example, narrow band imaging (NBI) light or infrared light).

Configuration of Display Device

A configuration of the display device 4 will be described next.

Under control by the control device 5, the display device 4 displays a display image based on an imaging signal input from the control device 5. The display device 4 is implemented by use of a display panel of, for example, organic electroluminescence (EL) or liquid crystal.

Configuration of Control Device

A configuration of the control device 5 will be described next.

The control device 5 controls each unit in the endoscope system 1. The control device 5 performs various types of image processing of an imaging signal input from the endoscope 2 and outputs the processed imaging signal to the display device 4. Furthermore, the control device 5 supplies illumination light to the endoscope 2 by controlling the light source device 3.

Main Parts of Endoscope System

Figure 2:
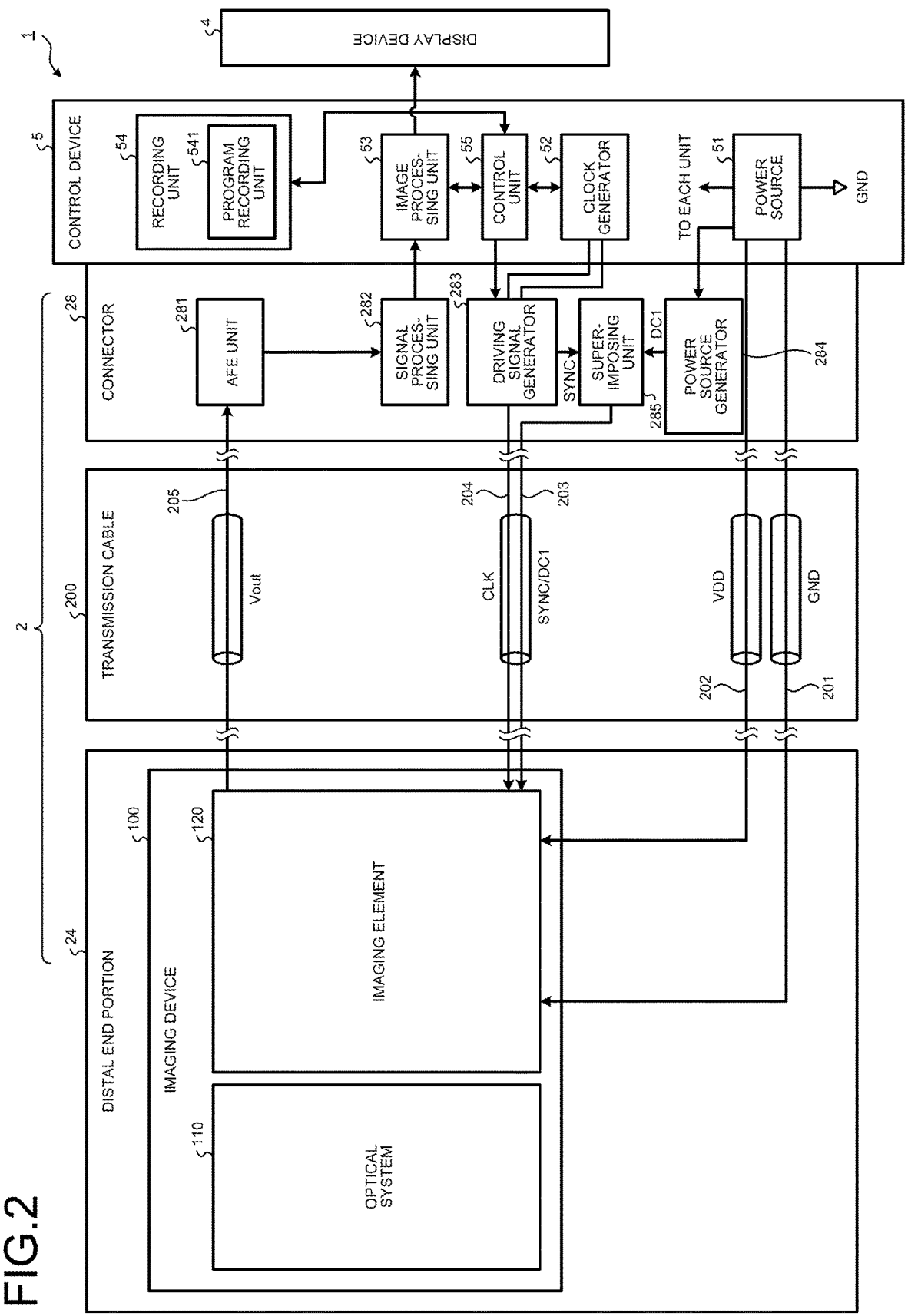
FIG. 2 is a block diagram illustrating a functional configuration of main parts of an endoscope and a control device, in the endoscope system according to the first embodiment.

A configuration of main parts of the endoscope 2 and the control device 5 described above will be described next. FIG. 2 is a block diagram illustrating a functional configuration of the main parts of the endoscope 2 and the control device 5.

Main Parts of Endoscope

A functional Configuration of main parts of the endoscope 2 Will be described first.

The endoscope 2 includes the imaging device 100, a transmission cable 200 provided inside the universal cord 23, and the connector 28.

The imaging device 100 is arranged the distal end portion 24 of the endoscope 2, generates an imaging signal by capturing an image of the interior of a subject, and outputs this imaging signal to the control device 5 via the transmission cable 200 in the universal cord. The imaging device 100 includes an optical system 110 and an imaging element 120 (an imaging module).

By condensing reflected light of illumination light reflected by a subject, the optical system 110 forms a subject image on light receiving surface of the imaging element 120. The optical system 110 is implemented by use of, for example, one or plural lenses.

By receiving a subject image formed by the optical system 110 and photoelectrically converting the subject image, the imaging element 120 generates an imaging signal. The imaging element 120 outputs the imaging signal to the control device 5 via the transmission cable 200. The imaging element 120 is implemented by use of, for example, a complementary metal oxide semiconductor (CMOS). A detailed configuration of the imaging element 120 will be described later.

The transmission cable 200 will be described next.

The transmission cable 200 is implemented by use of plural signal lines. Specifically, the transmission cable 200 is implemented by use of five signal lines, a signal line 201, a signal line 202, a signal line 203, a signal line 204, and a signal line 205. The signal line 201 is connected to ground GND. The signal line 202 transmits power source voltage VDD input from the control device 5 to the imaging device 100. The signal line 203 transmits, to the imaging device 100, a superimposed signal SYNC/DC1 input from the connector 28 and including a synchronization signal SYNC and a predetermined direct current component DC1 superimposed on each other. The signal line 204 transmits a clock signal CLK input from the connector 28, to the imaging device 100. The signal line 205 transmits an imaging signal Vout input from the imaging device 100, to the connector 28.

The connector 28 will be described next.

The connector 28 is detachably connected to the control device 5. The connector 28 includes an analog front end unit 281 (hereinafter, referred to as the "AFE unit 231"), a signal processing unit 282, a driving signal generator 283, a power source generator 284, and a superimposing unit 285.

The AFE unit 281 generates a digital imaging signal by performing processing, such as denoising and A/D conversion, of an imaging signal Vout transmitted through the signal line 205, and outputs this digital imaging signal to the signal processing unit 282.

The signal processing unit 282 performs predetermined signal processing, for example, format conversion processing and/or can up processing, of a digital imaging signal input from the AFE unit 281, and outputs the processed imaging signal to the control device 5.

On the basis of a clock signal input from the control device 5, the driving signal generator 283 generates a clock signal CLK and a synchronization signal SYNC for driving the imaging device 100, outputs the clock signal CLK to the signal line 204, and outputs the synchronization signal SYNC to the superimposing unit 285.

The power source generator 284 generates a direct current component DC1 resulting from adjustment of a predetermined voltage input from the control device 5 to a voltage value for driving a predetermined circuit in the imaging device 100, and outputs this direct current component DC1 to the superimposing unit 285.

The superimposing unit 285 outputs, to the signal line 204, a superimposed signal SYNC/DC1 resulting from superimposition of a synchronization signal SYNC and a direct current component DC1 on each other, the synchronization signal SYNC having been input from the driving signal generator 283, the direct current component DUI having been input from the power source generator 284.

A functional configuration of the control device 5 will be described next.

The control device 5 includes a power source a clock generator 52, an image processing unit 53, and a control unit 55.

On the basis of electric power input from outside, the power source 51 generates power source voltage VDD based on the ground GND. The power source 51 outputs the power source voltage VDD to the power source generator 284 and to each unit included in the control device 5.

The clock generator 52 generates a clock signal serving as a reference for operation of each unit in the endoscope system 1, and outputs this clock signal to the driving signal generator 283 of the connector 28 and to the control unit 55. The clock generator 52 is formed by use of a clock module, for example.

Under control by the control unit 55, the image processing unit 53 performs predetermined image processing of an imaging signal input from the signal processing unit 82 of the connector 28, and outputs the processed imaging signal to the display device 4. Examples of this predetermined image processing include white balance adjustment processing and demosaicing processing. The image processing unit 53 is implemented by use of a graphics processing unit (GPU) or a field programmable gate array (FPGA), for example.

The control unit 55 controls each unit in the endoscope system 1. The control unit 55 is implemented by use of a memory and a processor including hardware, such as a central processing unit (CPU).

Detailed Description of Imaging Element

Figure 3:
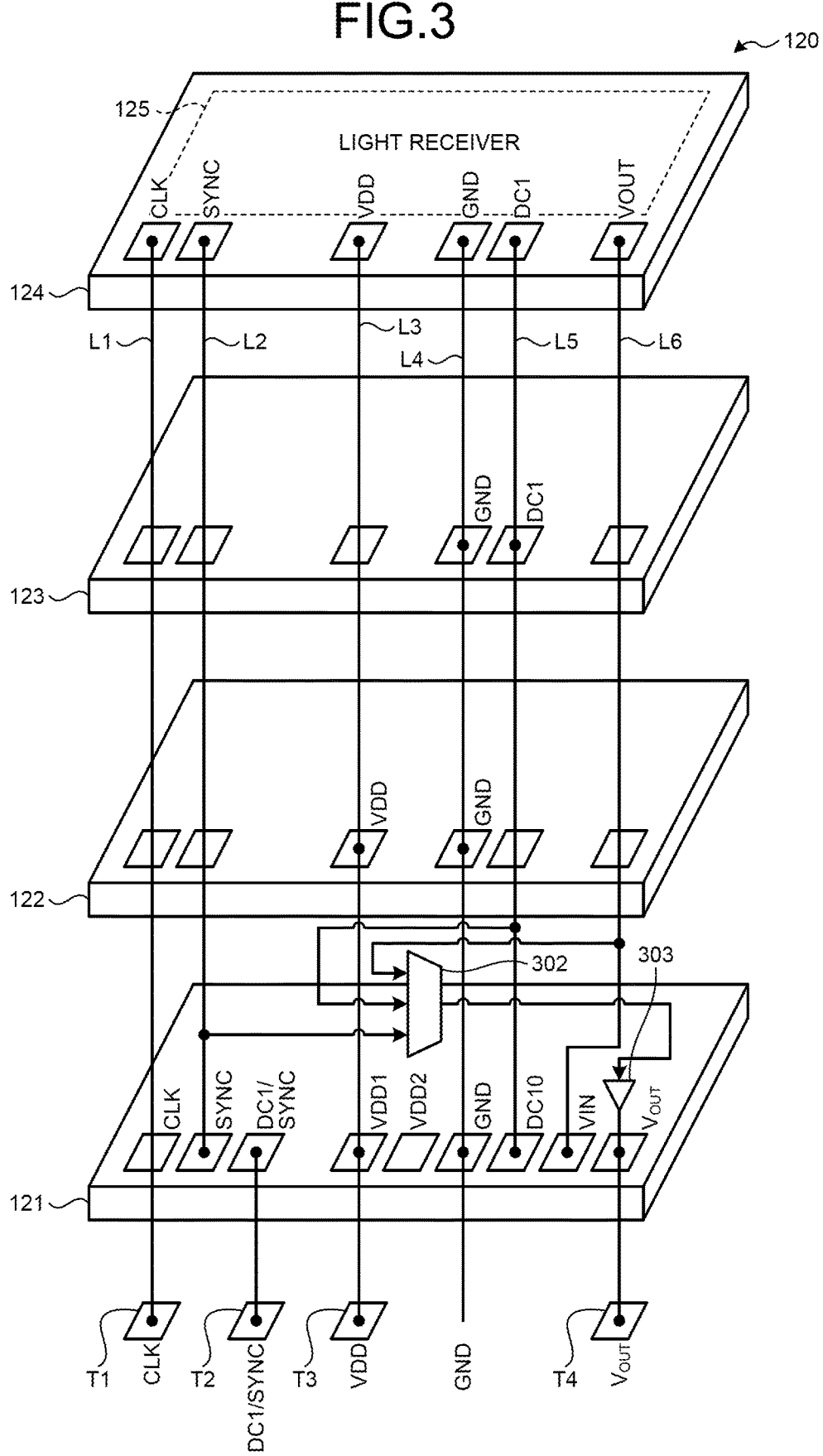
FIG. 3 is a diagram illustrating a schematic configuration of an imaging element according to the first embodiment.

A detailed configuration of the above described imaging element 120 will be described next. FIG. 3 is a diagram illustrating a schematic configuration of the imaging element 170.

Figure 4:
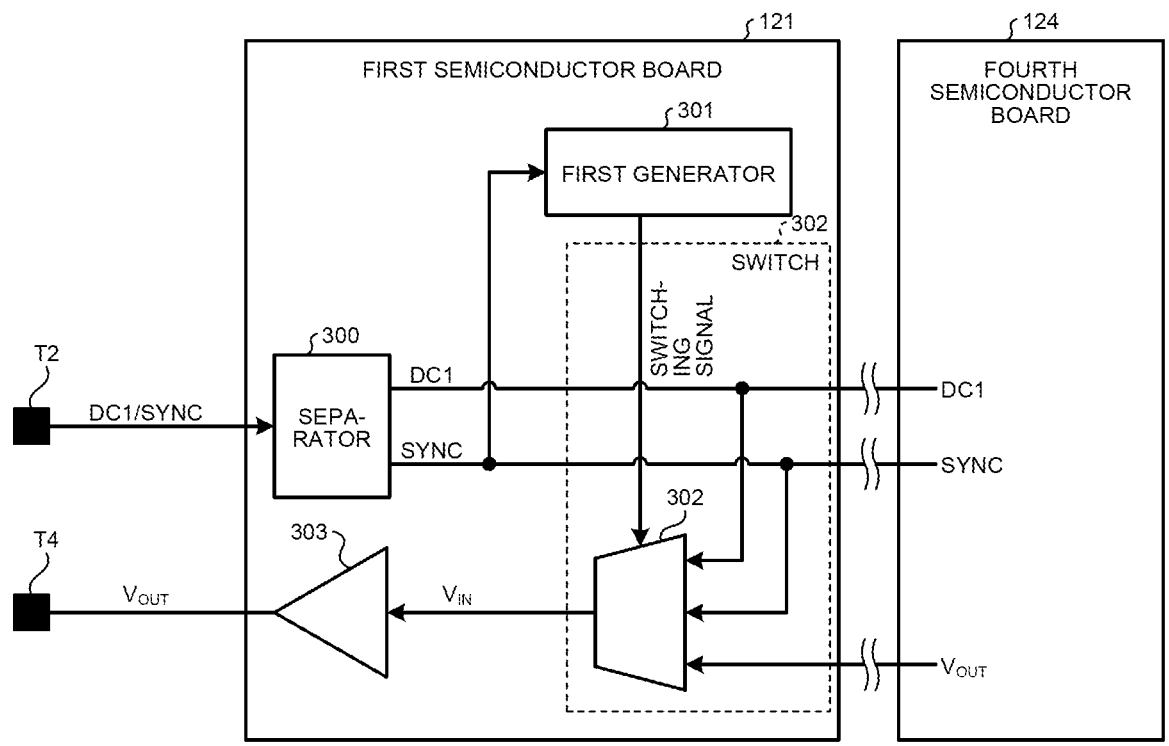
FIG. 4 is a schematic diagram illustrating a functional configuration of main parts of a first semiconductor board according to the first embodiment.

As illustrated in FIG. 3 and FIG. 4, the imaging element 170 includes: a first semiconductor board 121 (a peripheral circuit board) with a functional circuit arranged thereon, the functional circuit having a predetermined function; a second semiconductor board 122 with a VDD capacitor arranged thereon; a third semiconductor board 123 with a DC1 capacitor arranged thereon; and a fourth semiconductor board 124 with a light receiver 125 arranged thereon, the light receiver 125 including plural pixels that are arranged in a two-dimensional matrix and that each receive light and generate an imaging signal. The imaging element 120 includes the first semiconductor board 121, the Second semiconductor board 122, the third semiconductor board 123, and the fourth semiconductor board 124 layered over one another in this order. Specifically, the imaging element 120 includes the first semiconductor board 121 arranged as the undermost layer, the fourth semiconductor board 124 layered as the topmost layer of the imaging element 120, and the light receiver 125 arranged on a light receiving side thereof. In this first embodiment, the first semiconductor board 121, the second semiconductor board 122, and the third semiconductor board 123 function as circuit boards, and the fourth semiconductor board 124 functions as a pixel board.

Furthermore, transmission channels L1 to L6 are electrically connected to connection terminals T1 to T4 provided on the underside of the first semiconductor board 121 of the imaging element 120, and the transmission channels L1 to L6 are also electrically connected. The first semiconductor board 121, the second semiconductor board 122, the third semiconductor board 123, and the fourth semiconductor board 124 each include plural terminals therein, and form the plural transmission channels L1 to L6 that electrically connect these semiconductor boards to one another by, for example, interlayer connection using any one or more selected from a group of electrodes, through silicon vias (TSVs), and bumps. In this first embodiment, the transmission channels L1 to L6 function as wiring portions and the connection terminals T1 to T4 function as a terminal. The connection terminals T1 to T3 function as input terminals and the connection terminal T4 functions as an output terminal.

Every time a semiconductor board for the imaging element 120 is layered, connection states of the transmission channels L1 to L6 are tested. In a case where any one of the first semiconductor board 121, the second semiconductor board 122, the third semiconductor board 123, and the fourth semiconductor board 124 has poor connection after they have been mounted in the endoscope 2, identifying which one of the transmission channels L1 to L6 has the failure used to be impossible. For example, in a case where the transmission channel L2, has poor contact, identifying the part causing the poor contact conventionally used to be difficult because the only failure that used to be observable was the inability of the imaging signal Vout to be output from the imaging element 120.

In this first embodiment, a switch 302 is thus provided in the imaging element 120. This switch 302 outputs, by selective switching, at least One of an imaging signal Vout output from the light receiver 125 and an internal signal, to the connection terminal T4. The internal signal is generated at any one of the first semiconductor board 121, the second semiconductor board 122, and the third semiconductor board 123.

FIG. 4 is a schematic diagram illustrating a functional configuration of main parts of the first semiconductor board 121. As illustrated in FIG. 4, the first semiconductor board 121 includes at least a separator 300, a first generator 301, the switch 302, and an amplifier 303.

The separator 300 separates a direct current component DC1 and a synchronization signal SYNC from a superimposed signal input from the connector 28 via the connection terminal T2. The separator 300 transmits the separated direct current component DC1 and synchronization signal SYNC, to the fourth semiconductor board 124 of the topmost layer, via the transmission channel L1 and transmission channel L5. Furthermore, each of the direct current component DC1 and synchronization signal SYNC separated by the separator 300 is input to the switch 302.

The first generator 301 is electrically connected to the transmission channel L2 and generates, on the basis of the synchronization signal SYNC separated by the separator 300, a switching signal for switching output of the switch 302. Specifically, the first generator 301 generates a switching signal according to a synchronization signal SYNC having a predetermined test mode pattern embedded therein. More specifically, the first generator 301 generates, once per frame of the imaging element 120, a switching signal by using a synchronization signal SYNC having, for example, an 8-bit pattern. For example, in a normal mode where the switch 302 is caused to output an imaging signal Vout from the fourth semiconductor board 124, when the first generator 301 receives a synchronization signal SYNC having a pattern, "11001100", embedded therein, the first generator 301 causes the switch 302 to output an imaging signal Vout. In contrast, in a test mode where the switch 302 is caused to output a synchronization signal SYNC, when the first generator 301 receives a synchronization signal SYNC having a pattern, "10101010", embedded therein, the first generator 301 causes the switch 302 to output a synchronization signal SYNC The first generator 301 is implemented by use of, for example, a semiconductor switch, a multiplexer, and a control register. In this first embodiment, the first generator 301 functions as a switching signal generator.

The switch 302 is arranged on the transmission channel L2 and transmission channel L5 of the separator 300 and the fourth semiconductor board 124 and is also arranged on the transmission channel L6 of the amplifier 303 and the fourth semiconductor board 124. Specifically, the switch 302 is electrically connected to each of the separator 300 and the fourth semiconductor board 124. The switch 302 outputs, by selective switching, at least one of an imaging signal Vout output from the light receiver 125 and an internal signal generated by any one of the first semiconductor board 121, the second semiconductor board 122, and the third semiconductor board 123, to the connection terminal T4. The switch 302 is implemented by use of, for example, a semiconductor switch, a multiplexer, and a control register.

The amplifier 303 amplifies a signal $V_{IN}$ input from the switch 302. The signal $V_{IN}$ is output to the outside via the connection terminal T4. The amplifier 303 is implemented by use of a buffer circuit, for example.

Testing Method by Endoscope System

A testing method executed by the endoscope system 1 will be described next. FIG. 5 is a flowchart illustrating an outline of the testing method executed by the endoscope system 1.

As illustrated in FIG. 5, the control unit 55 causes the driving signal generator 283 to transmit a synchronization signal SYNC corresponding to a predetermined test mode (Step S101).

Subsequently, on the basis of the synchronization signal SYNC separated by the separator 300, the first generator 301 generates a switching signal according to the test mode and outputs this switching signal to the switch 302 (Step S102).

Thereafter, the switch 302 outputs a signal according to the switching signal input from the first generator 301 (Step S103). FIG. 6 is a diagram illustrating correspondence between test modes, output signals output from the imaging element 120, determination results, and state results indicating states of the imaging element 120. As illustrated in FIG. 6, in a case where a switching signal that causes the switch 302 to output an imaging signal Vout has been input from the first generator 301, the switch 302 outputs an imaging signal Vout input from the fourth semiconductor board 124.

Subsequently, the control unit 55 records, into a recording unit 54, an output result that has been input from the endoscope 2 and the image processing unit 53 (Step S104)

and determines whether or not all of test modes have ended (Step S105). In a case where the control unit 55 determines that all of the test modes have ended (Step S105: Yes), the endoscope system 1 proceeds to Step S106 described later. On the contrary in a case where the control unit 55 determines that not all of the test modes have ended (Step S105: No), the endoscope system 1 returns to Step S101 described above.

At Step S106, by controlling the image processing unit 53, the control unit 55 causes the display device 4 to display information according to all of output results for the test modes recorded in the recording unit 54. After step S106, the endoscope system 1 ends processing.

FIG. 7 is a diagram associating between the test modes, the determination results, and defective parts that are able to be presumed to be defective from the determination results. As illustrated in FIG. 7, the control unit 55 causes the display device 4 to display the defective parts according to the output results for the modes. For example, as illustrated in FIG. 7, in a case where each of the output results for a first test mode to a third test mode is "good", the control unit 55 causes the display device 4 to display information indicating that the imaging element 120 is normal. On the contrary, in a case where each of the output results for the first test mode and the second test mode is "good" and the output result for the third test mode is "not good", the control unit 55 causes the display device 4 to display information indicating that a failure is occurring in a peripheral circuit provided on the first semiconductor board 121. A user is thereby able to identify any defective part of the imaging element 120 by checking the information displayed by the display device 4.

The first embodiment described above enables external identification of any part causing poor connection because the switch 302 outputs, by selective switching, at least one of an imaging signal Vout and an internal signal.

Furthermore, the first embodiment enables external identification of any part causing poor connection because the first generator 301 generates, on the basis of a synchronization signal SYNC separated by the separator 300, a switching signal according to a test mode, outputs this switching signal to the switch 302, and the switch 302 is caused to output a signal according to the test mode.

Furthermore, the first embodiment enables reduction in the diameter of the endoscope 2 because the number of the signal linen in the transmission cable 200 is able to be reduced by separation of a synchronization signal. SYNC and a direct current component DC1 by the separator 300.

Second Embodiment

A second embodiment will be described next. In the first embodiment described above, a superimposed signal including a synchronization signal SYNC and a direct current component DC1 superimposed on each other is transmitted to the imaging element 120, but in the second embodiment, a superimposed signal including a synchronization signal SYNC and a clock signal CLK superimposed on each other is transmitted to an imaging element Main parts of an endoscope system according to the second embodiment will be described hereinafter. The same reference signs will be assigned to components that are the same as those of the above described endoscope system 1 according to the first embodiment, and detailed description thereof will thus be omitted.

Main Parts of Endoscope System

Figure 8:
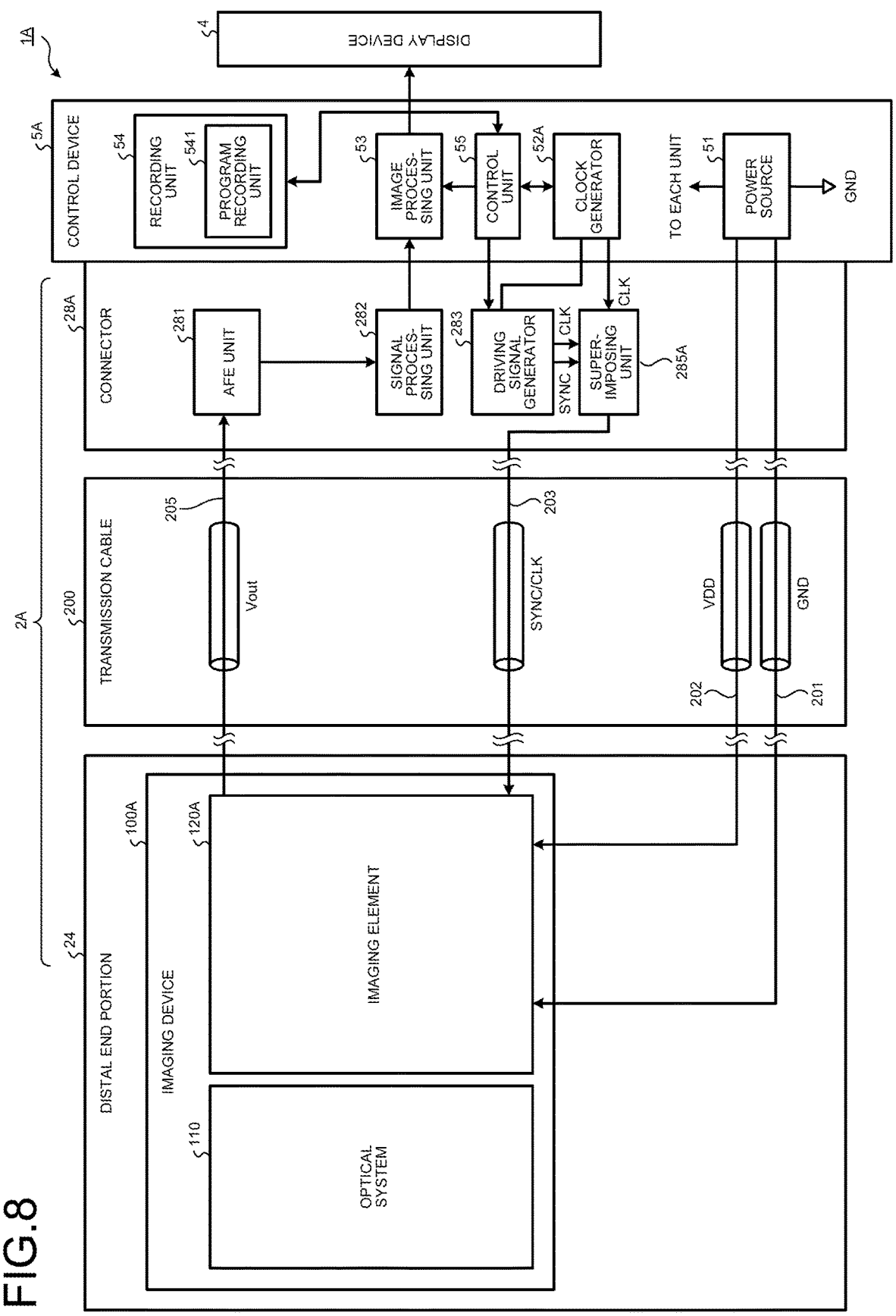
FIG. 8 is a block diagram illustrating a functional configuration of main parts of an endoscope and a control device in an endoscope system according to a second embodiment.

FIG. 8 is a block diagram illustrating a functional configuration of main parts of an endoscope and a control device in the endoscope system according to the second embodiment. An endoscope system 1A illustrated in FIG. 8 includes an endoscope 2A instead of the above described endoscope 2 according to the first embodiment. The endoscope 2A includes a connector 28A and an imaging device 100A, instead of the above described connector 28 and imaging device 100 according to the first embodiment.

The connector 28A includes a superimposing unit 285A instead of the above described superimposing unit 285 according to the first embodiment. The superimposing unit 285A generates a superimposed signal resulting from superimposition of a clock signal CLK on a synchronization signal SYNC input from the driving signal generator 283 and transmits this superimposed signal to the imaging device 100A.

The imaging device 100A includes an imaging element 120A, instead of the above described imaging element 120 according to the first embodiment. The imaging element 120A is implemented by use of a CMOS, for example. A detailed configuration of the imaging element 120A will be described later.

Detailed Description of Imaging Element

Figure 9:
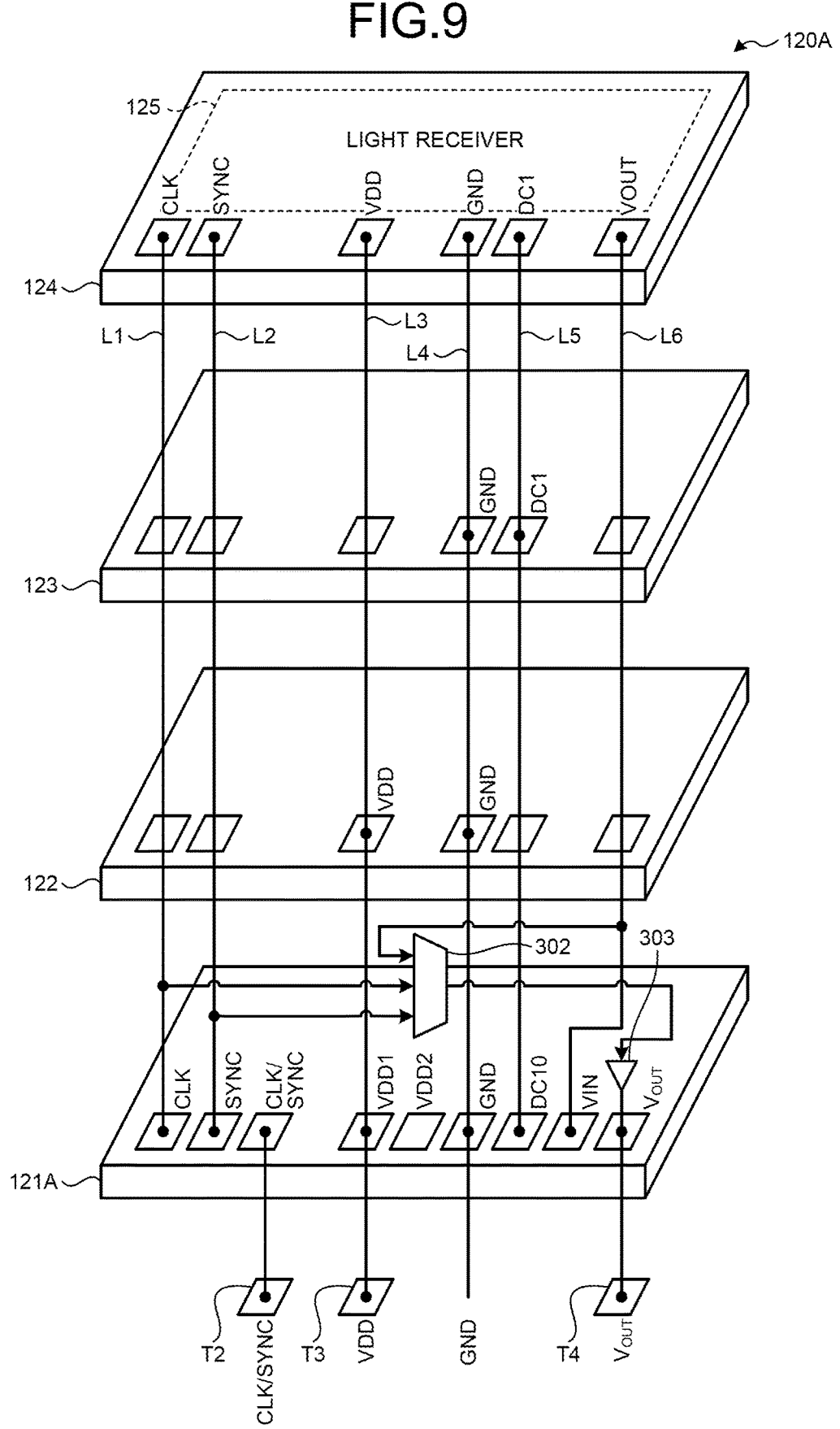
FIG. 9 is a diagram illustrating a schematic configuration of an imaging element according to the second embodiment.

The detailed configuration of the above mentioned imaging element 120A will be described next. FIG. 9 is a diagram illustrating a schematic configuration of the imaging element 120A. The imaging element 120A illustrated in FIG. 9 includes a first semiconductor board 121A instead of the above described first semiconductor board 121.

Main Parts of First Semiconductor Board

Figure 10:
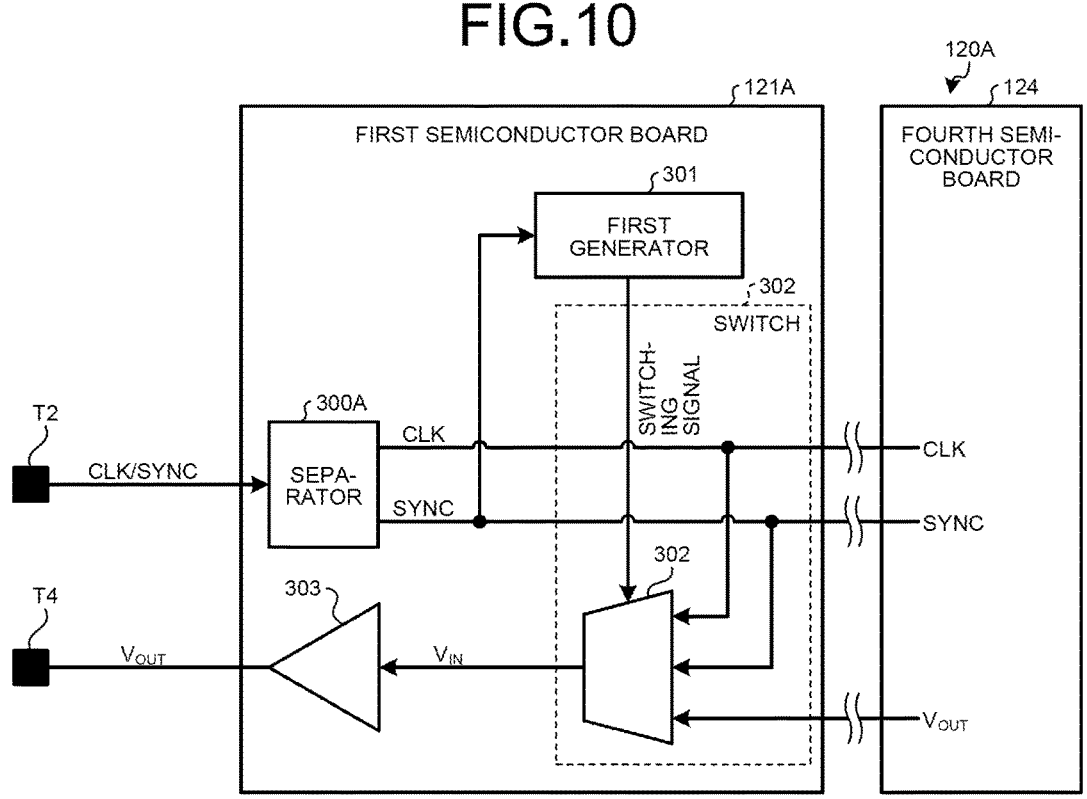
FIG. 10 is a schematic diagram illustrating a functional configuration of main parts of a first semiconductor board according to the second embodiment.

FIG. 10 is a schematic diagram illustrating a functional configuration of main parts of the first semiconductor board 121A. The first semiconductor board 121A illustrated in FIG. 10 includes a separator 300A, instead of the above described separator 300.

The separator 300A separates a synchronization signal SYNC and a clock signal CLK, from a superimposed signal input from the connector 28A via the connection terminal T2. The separator 300A transmits the separated synchronization signal SYNC and clock signal CLK, to the fourth semiconductor board 124 of the topmost layer, via the transmission channel L1 and transmission Channel L2. Furthermore, each of the synchronization signal SYNC and clock signal CLK separated by the separator 300A is input to the switch 302.

Similarly to the above described imaging element 120, the imaging element 120A configured as described above outputs, on the basis of a switching signal input to the switch 302 by the first generator 301, any one of the imaging signal Vout, a synchronization signal SYNC, and a clock signal CLK, to the control device 5. In this case, by a testing method similar to that according to the first embodiment described above, the control device determines a defective part of the imaging element 120A according to a signal output by the imaging element 120A and displays a result of this determination on the display device 4. As a result, a user is able to identify the defective part of the imaging element 120A.

The second embodiment described above enables a part causing poor connection to be identified externally because the switch 302 outputs, by selective switching, at least one of an imaging signal Vout and an internal signal.

Third Embodiment

A third embodiment will be described next. In this third embodiment, a first semiconductor board has a configuration different from that of the above described first semiconductor board 121 according to the first embodiment. Main parts of the first semiconductor board according to the third embodiment will be described hereinafter. The same reference signs will be assigned to components that are the same as those of the above described endoscope system 1 according to the first embodiment, and detailed description thereof will thus be omitted.

Main Parts of First Semiconductor Board

Figure 11:
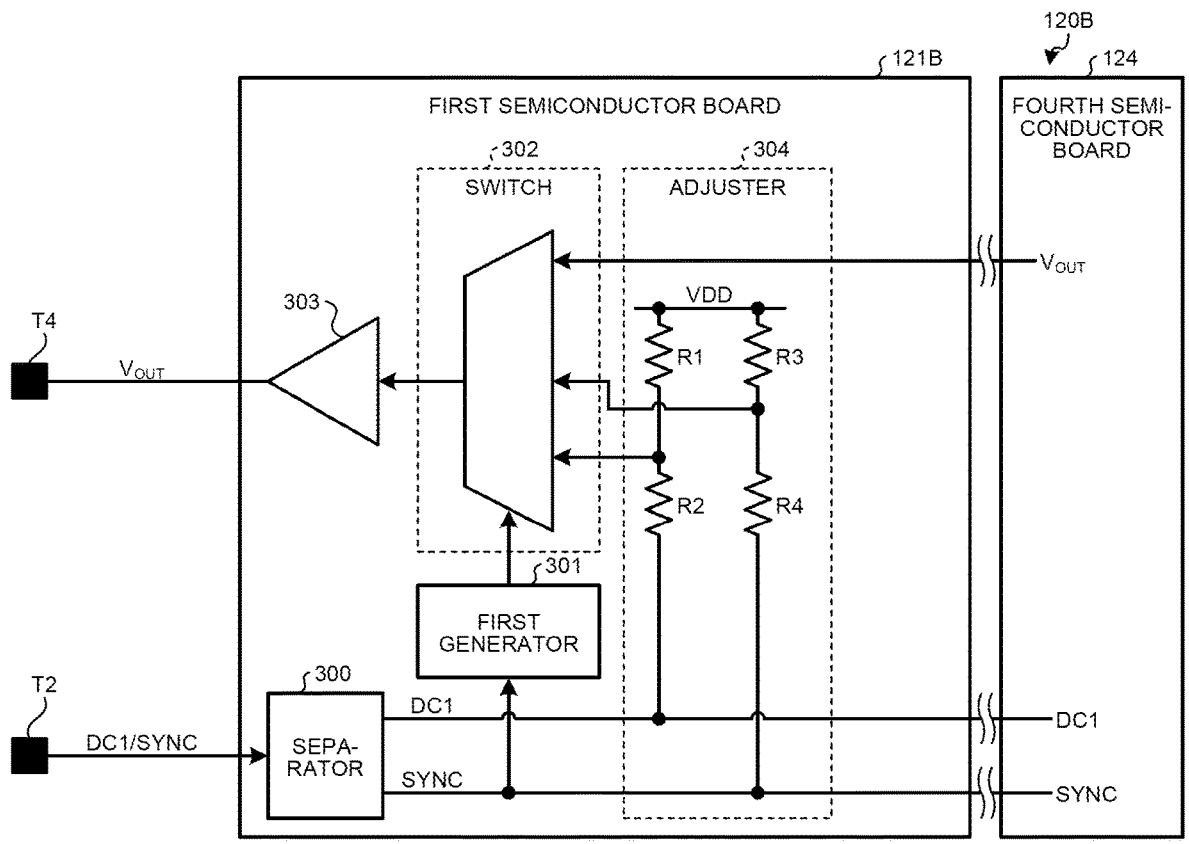
FIG. 11 is a schematic diagram illustrating a functional configuration of main parts of a first semiconductor board according to a third embodiment.

FIG. 11 is a schematic diagram illustrating a functional configuration of the main parts of the first semiconductor board according to the third embodiment. A first semiconductor board 121B in an imaging device 120B illustrated in FIG. 11 further includes an adjuster 304, in addition to the above described configuration of the first semiconductor board 121 according to the first embodiment.

The adjuster 304 is arranged between output signals from the switch 302 and the separator 300. The adjuster 304 adjusts the level of the operation range of the amplifier 303. The adjuster 304 includes a resistor R1, a resistor R2, a resistor R3, and a resistor R4. The resistor R1 and the resistor R2 are electrically connected to signal lines that transmit power source voltage VDD and a direct current component DC1, and output values divided from the power source voltage VDD and direct current component DC1, to the switch 302. The resistor R3 and the resistor R4 are electrically connected to the signal line that transmits the power source voltage VDD and a signal line that transmits a synchronization signal SYNC, and output values divided from the power source voltage VDD and synchronization signal SYNC, to the switch 302.

The third embodiment described above enables a part causing poor connection to be identified externally because the switch 302 outputs, by selective switching, at least one of an imaging signal Vout and an internal signal.

Furthermore, the third embodiment enables output of a stable signal because the adjuster 304 adjusts the level of operation range of the amplifier 303.

Fourth Embodiment

A fourth embodiment will be described next. In this fourth embodiment, a first semiconductor board has a configuration different from that of the above described first semiconductor board 121A according to the second embodiment. Main parts of the first semiconductor board according to the fourth embodiment will be described hereinafter. The same reference signs will be assigned to components that are the same as those of the above described endoscope system 1 according to the first embodiment, and detailed description thereof will thus be omitted.

Main Parts of First Semiconductor Board

Figure 12:
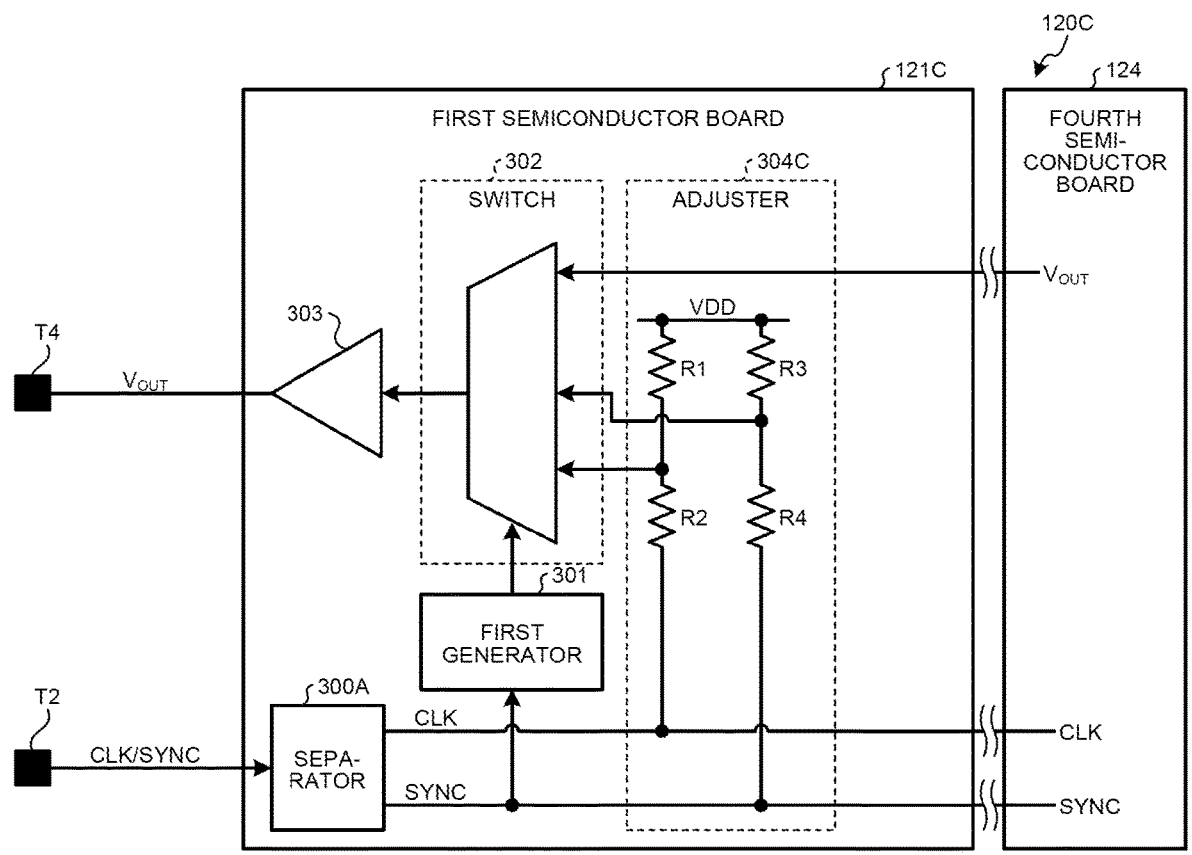
FIG. 12 is a schematic diagram illustrating a functional configuration of main parts of a first semiconductor board according to a fourth embodiment.

FIG. 12 is a schematic diagram illustrating a functional configuration of the main parts of the first semiconductor board according to the fourth embodiment. A first semiconductor board 121C illustrated in FIG. 12 further includes an adjuster 304C in addition to the above described configuration of the first semiconductor board 121A according to the second embodiment.

The adjuster 304C is arranged between output signals from the switch 302 and separator 300A. The adjuster 304C adjusts the level of the operation range of the amplifier 303. The adjuster 304C includes the resistor R1, the resistor R2, the resistor R3, and the resistor R4. The resistor R1 and the resistor R2 are connected to signal lines that transmit power source voltage VDD and a clock signal CLK, and output values divided from the power source voltage VDD and clock signal CLK, to the switch 307. The resistor R3 and the resistor RA are electrically connected to the signal line that transmits the power source voltage VDD and a signal line that transmits a synchronization signal SYNC, and output values divided from the power sources VDD and the synchronization signal SYNC, to the switch 307.

The fourth embodiment described above enables a part causing poor connection to be identified externally because the switch 302 outputs, by selective switching, at least one of an imaging signal Vout and an internal signal.

Furthermore, the fourth embodiment enables output of a stable signal because the adjuster 304C adjusts the level of the operation range of the amplifier 303.

Fifth Embodiment

A fifth embodiment will be described next. In this fifth embodiment, a first semiconductor board has a configuration different from that of the above described first semiconductor board 121 according to the first embodiment. Main parts of the first semiconductor board according to the fifth embodiment will be described hereinafter. The same reference signs will be assigned to components that are the same as those of the above described endoscope system 1 according to the first embodiment, and detailed description thereof will thus be omitted.

Main Parts of First Semiconductor Board

Figure 13:
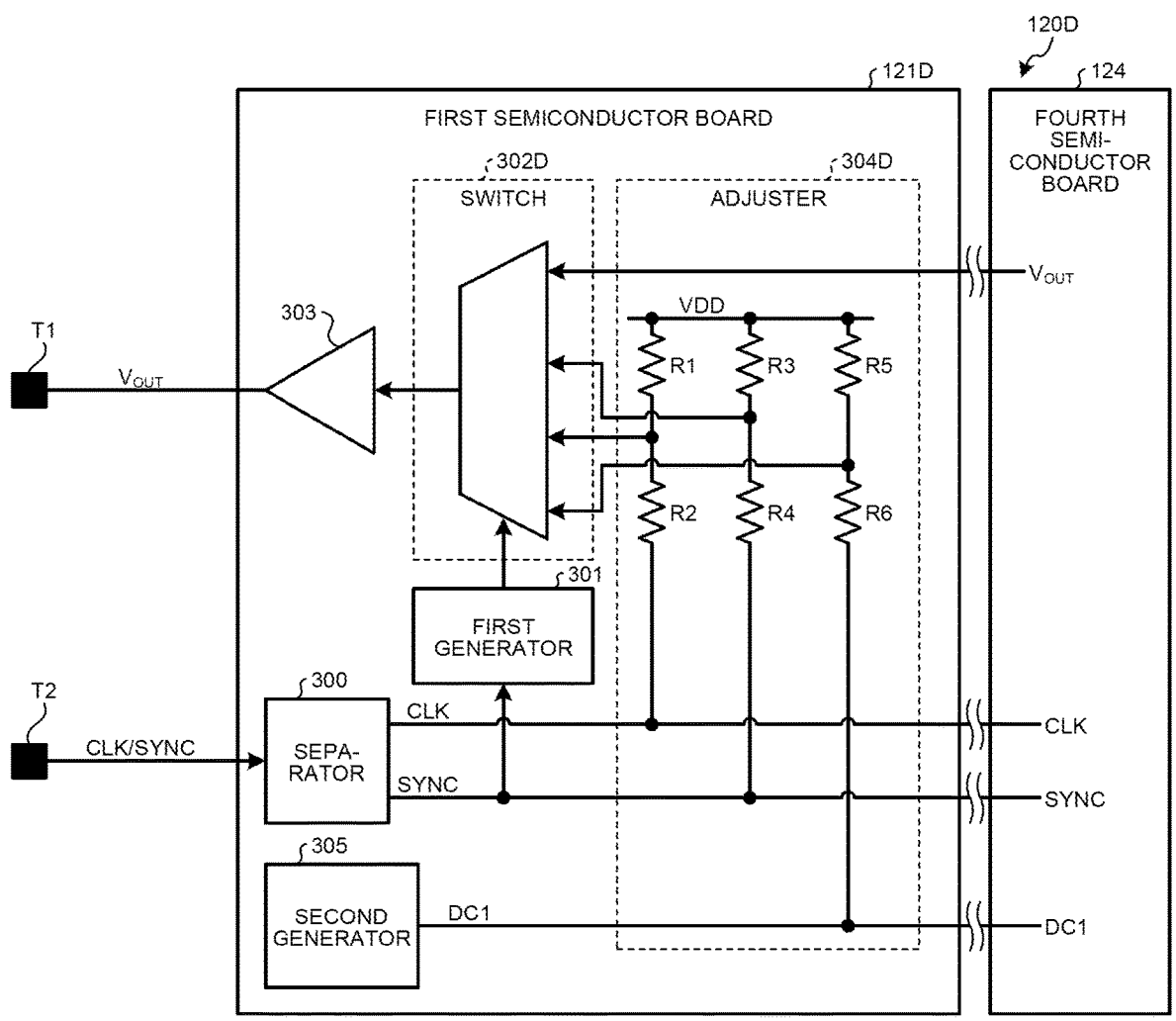
FIG. 13 is a schematic diagram illustrating a functional configuration of main parts of a first semiconductor board according to a fifth embodiment.

FIG. 13 is a schematic diagram illustrating a functional configuration of the main parts of the first semiconductor board according to the fifth embodiment. A first semiconductor board 121D illustrated in FIG. 13 further includes an adjuster 304D and a second generator 305, in addition to the above described configuration of the first semiconductor board 121A according to the second embodiment.

The adjuster 304D includes a resistor R5 and a resistor R6, in addition to the above described Configuration of the adjuster 304C according to the fourth embodiment. The resistor R5 and the resistor R6 are electrically connected to signal lines that transmit power source voltage VDD and a direct current component DC1 generated by the second generator 305 described later, and output values divided from the power source voltage VDD and direct current component DC1.

On the basis of the power source voltage VDD input from the control device 5, the second generator 305 generates a direct current component DC1 for driving an imaging element 120D, and outputs this direct current component DC1 to the fourth semiconductor hoard 124 and the adjuster 304D. The second generator 305 is implemented by use of, for example, a regulator or a charge pump circuit. In this fifth embodiment, the second generator 305 functions as a voltage generator.

The fifth embodiment described above enables a part causing poor connection to be identified externally because the switch 302 outputs, by selective switching, at least one of an imaging signal Vout and an internal signal.

Furthermore, the fifth embodiment enables reduction in the diameter of the endoscope 2 because: the second generator 305 generates, on the basis of power source voltage VDD input from the control device 5, a direct current component DC1 for driving the imaging element 120D, and outputs this direct current component DC1 to the fourth semiconductor board 124 and adjuster 304D; and the number of signal lines in the transmission cable 200 is thereby able to be reduced.

Sixth Embodiment

A sixth embodiment will be described next. In the third embodiment described above, only the first semiconductor board 121B includes the switch 302 and adjuster 304 provided thereon, but in this sixth embodiment, a switch and an adjuster are provided on each semiconductor board. A configuration of an imaging element according to the sixth embodiment will be described hereinafter. The same reference signs will be assigned to components that are the same as those of the above described endoscope system 1 according to the first embodiment and the above described first semiconductor board 121B according to the third embodiment.

Main Parts of Imaging Element

Figure 14:
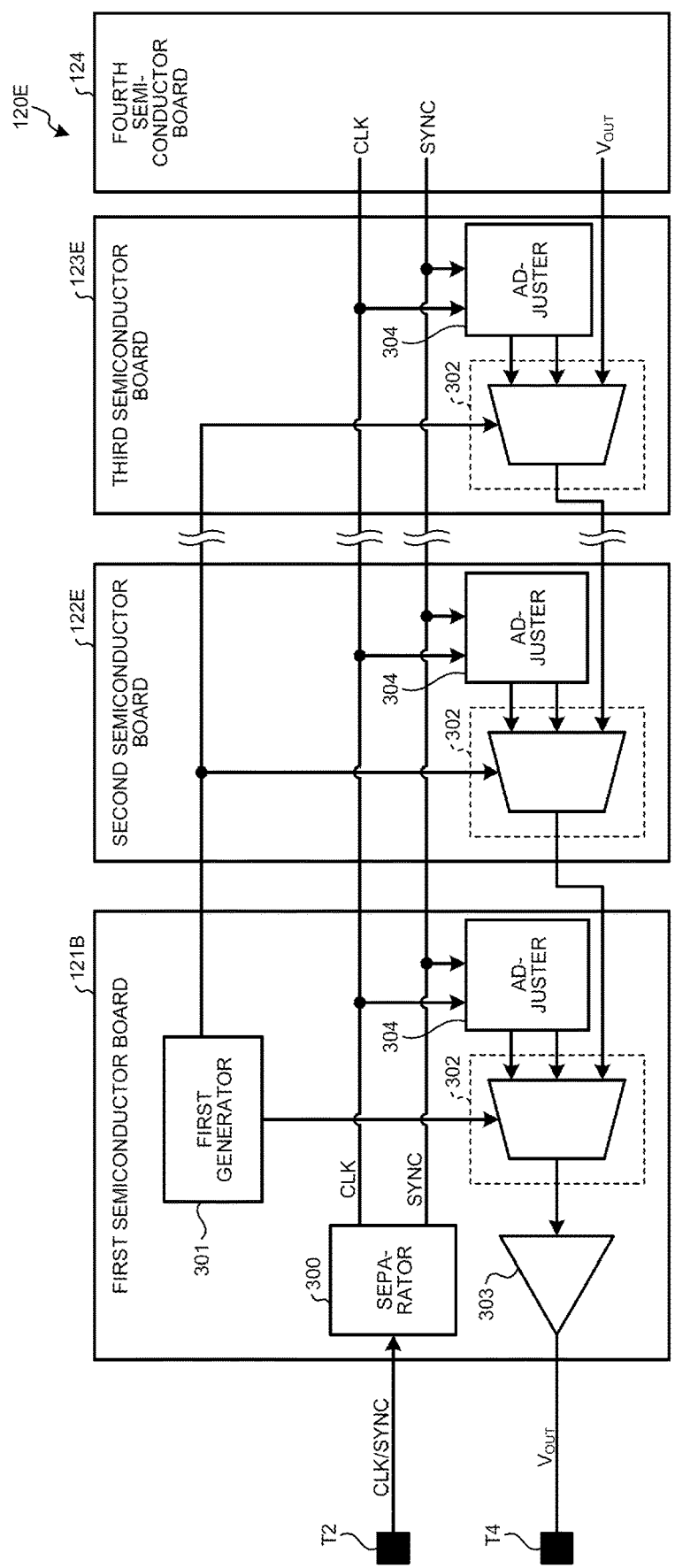
FIG. 14 is a schematic diagram illustrating a functional configuration of main parts of an imaging element according to a sixth embodiment.

FIG. 14 is a schematic diagram illustrating a functional configuration of main parts of the imaging element according to the sixth embodiment. An imaging element 120E illustrated in FIG. 14 includes the first semiconductor board 121B, a second semiconductor board 122E, and a third semiconductor board 123E.

Each of the se and semiconductor board 122E and third semiconductor board 123E further includes a switch 302 and an adjuster 304, in addition to the above described configuration of the second semiconductor board 122 or the third semiconductor board 123 according to the first embodiment.

The sixth embodiment described above enables any part causing interlayer poor connection to be identified because the switch 302 is arranged on each of the first semiconductor board 121B, the second semiconductor board 122E, and the third semiconductor board 123E.

In the sixth embodiment, the switch 302 is arranged on each of the first semiconductor board 121B, the second semiconductor board 122E, and the third semiconductor board 123E, but without being limited to this configuration, any of these switches 302 may be omitted as appropriate. For example, the switches 302 on the first semiconductor board 121B and third semiconductor board 123E may be omitted, or the switch 302 on the second semiconductor board 122E may be omitted. Of course, any of the adjusters 304 may also be omitted as appropriate.

Seventh Embodiment

A seventh embodiment will be described next. In the first embodiment described above, the switch 302 is provided on the first semiconductor board 121, but in this seventh embodiment, a switch and an adjuster are provided on a fourth semiconductor board. A configuration of an imaging element according to the seventh embodiment will be described hereinafter. The same reference signs will be assigned to components that are the same as those of the above described endoscope system 1 according to the first embodiment and the above described first semiconductor board 121B according to the third embodiment.

Main Parts of Imaging Element

Figure 15:
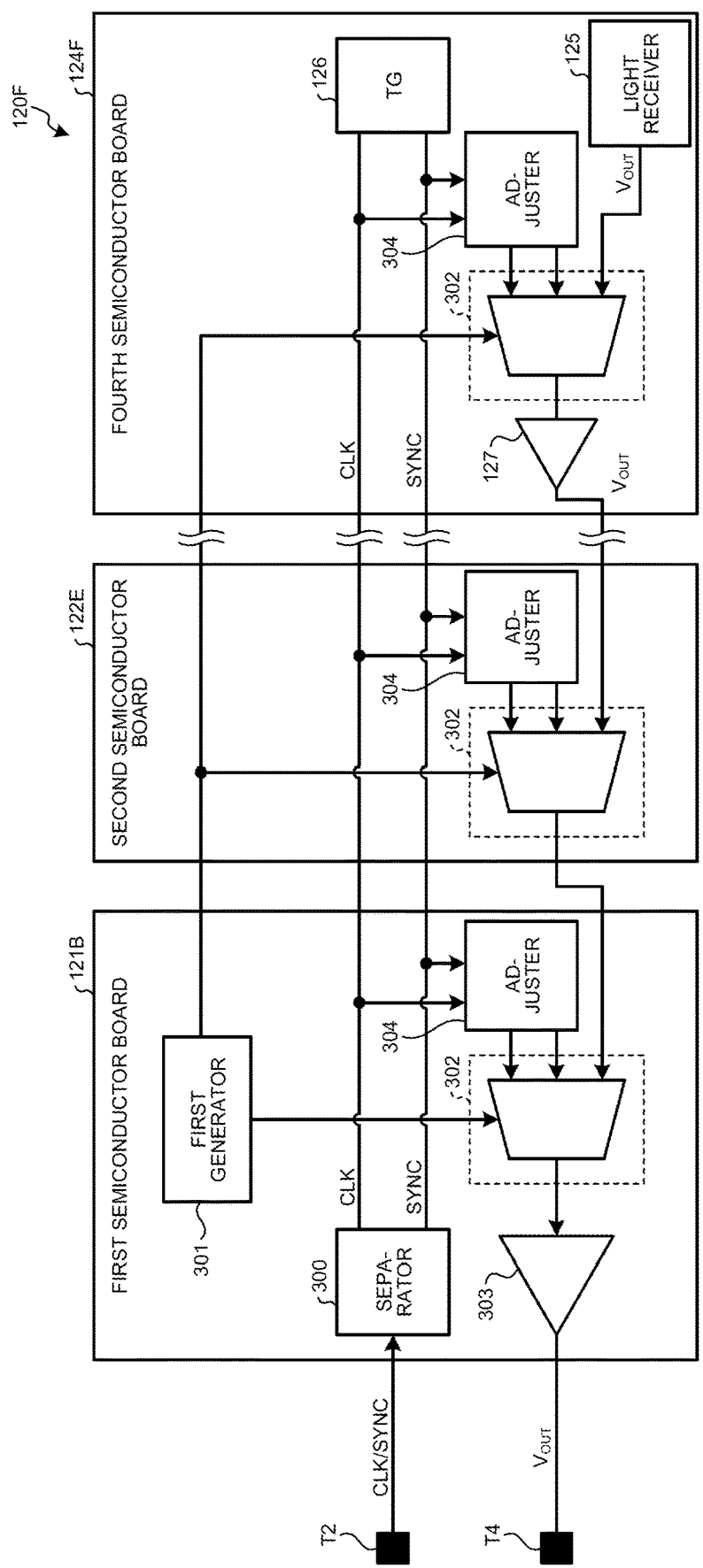
FIG. 15 is a schematic, diagram illustrating a functional configuration of main parts of an imaging element according to a seventh embodiment.

FIG. 15 is a schematic diagram illustrating a functional configuration of main parts of the imaging element according to the seventh embodiment. An imaging element 120F illustrated in FIG. 15 includes the first semiconductor board 121B, the above described second semiconductor board 122E according to the sixth embodiment, the third semiconductor board 123, and a fourth semiconductor board 124F.

The fourth semiconductor board 124F includes a timing generator (TG) 126, an amplifier 127, the switch 302, and the adjuster 304, in addition to the above described configuration of the fourth semiconductor board 124 according to the first embodiment.

According to a synchronization signal SYNC and a clock signal CLK separated by the separator 300 via the first semiconductor board 121B, second semiconductor board 122E, and third semiconductor board 123, the TG 126 controls the timing of reading by the light receiver 125; the amplifier 127; and each unit of the imaging element 120F.

The amplifier 127 amplifies a synchronization signal SYNC and a clock signal CLK input via the adjuster 304 and switch 302 and outputs the amplified synchronization signal SYNC and clock signal CLK. Furthermore, the amplifier 127 amplifies an imaging signal Vout input from the light receiver 125 and outputs the amplified imaging signal Vout. The amplifier 127 is implemented by use of a buffer circuit, for example.

The imaging element 120F configured as described above enables testing of whether or not a failure is occurring in any of the semiconductor boards by causing each semiconductor board to output a signal according to plural test modes, similarly to the above described first embodiment.

FIG. 16 is a diagram illustrating correspondence between test modes, output signals output from the imaging element 120F, determination results, and state results indicating states of the imaging element 120F. FIG. 17 is a diagram associating between the test modes, the determination results, and defective parts that are able to be presumed to be defective from the determination results.

As illustrated in FIG. 16 and FIG. 17, the control unit 55 causes the display device 4 to display any defective parts according to output results for different test modes. For example, as illustrated in FIG. 17, in a case where each of the output results for a first test mode to a seventh test mode is "good", the control unit 55 causes the display device 4 to display information indicating that the imaging element 120F is normal. In contrast, in a case where the output result for the first test mode is "not good" and the output results for the second test mode to the seventh test mode are "good", the control unit 55 causes the display device 4 to display information indicating that a failure is occurring at the fourth semiconductor board 124F. A user is thereby able to identify any defective part of the imaging element 120F by checking the information displayed by the display device 4.

The seventh embodiment described above enables any part causing interlayer poor connection to be identified because the switch 302 is arranged on each of the first semiconductor board 121B, the second semiconductor board 122E, and the fourth semiconductor board 124F.

In the seventh embodiment, the switch 302 is arranged on each of the first semiconductor board 121B, the second semiconductor board 122E, and the fourth semiconductor board 124F, but without being limited to this configuration, any of the switches 302 may be omitted as appropriate. For example, the switch 302 of the first semiconductor board 121B may be omitted, or the switch 302 of the second semiconductor board 122E may be omitted. Of course, any of the adjusters 304 may also be omitted as appropriate.

Other Embodiments

Various embodiments may be formed by combination, as appropriate, of plural components disclosed with respect to the above described endoscope systems according to the first to seventh embodiments of the present disclosure. For example, some of the components described with respect to the endoscope system/systems according to any of the above described embodiments of the present disclosure may be eliminated. Furthermore, any components described with respect to the endoscope system/systems according to any of the above described embodiments of the present disclosure may be combined as appropriate.

Furthermore, in the endoscope systems according to the first to seventh embodiments of the present disclosure, the first generator 301 generates a switching signal on the basis of a test pattern embedded in a synchronization signal SYNC, but the generating of the switching signal is not limited to this example. For example, the first generator 301 may generate a switching signal on the basis of a voltage value of power source voltage input from the outside. In this case, the first generator 301 may be implemented by use of, for example, an A/D conversion circuit and a voltage detection circuit, and may output a switching signal in a case where a predetermined voltage (for example, 3 V or less) is detected, the predetermined voltage not being the voltage value of the power source voltage input from the outside, for example, 3.3 V. Of course, the connection terminal T4 may be configured to enable bidirectional communication, and in a case where an imaging signal Vout is input, the switch 302 may output the imaging signal Vout to the outside; and in a case where an external signal is input via the connection terminal T4, the switch 302 may cause the connection terminal T4 to output an internal signal.

Furthermore, the imaging elements according to the first to seventh embodiments of the present disclosure may each include a probing pad provided on the light receiving surface of the fourth semiconductor board, the probing pad being a pad with which a testing probe is to be brought into contact. In this case, after testing of interlayer connections between the semiconductor boards is ended, any exposed part of the probing pad may be sealed with a resin, for example.

Furthermore, the "units" described above with respect to the endoscope systems according to the first to seventh embodiments of the present disclosure may be read as "means" or "circuits". For example, the control unit may be read as a control means or a control circuit.

In the description of the flowcharts in this specification, the context of the processing among the steps is disclosed by use of expressions, such as "firstly", "thereafter", and "subsequently", but sequences in the processing needed for implementation of the disclosure are not uniquely defined by these expressions. That is, the sequences in the processing in the flowcharts described in this specification may be modified as far as no contradiction arises from the modification.

Some of embodiments of the present application have been described in detail hereinbefore on the basis of the drawings, but these are just examples. The disclosure may be implemented in various other modes modified or improved on the basis of the modes described through the present disclosure and knowledge of those skilled in the art.

According to the present disclosure, a part causing poor connection is able to be identified externally.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging element, comprising:
    a pixel board including a light receiver arranged on the pixel board, the light receiver including plural pixels that are arranged in a two-dimensional matrix, each pixel being configured to receive light from an outside of the pixel and generate an imaging signal according to quantity of the light received;
    a circuit board including a functional circuit with a predetermined function, the pixel board being layered on the circuit board;
    plural wiring portions configured to electrically connect the pixel board and the circuit board to each other and electrically transmit signals between respective layers;
    a terminal provided on the circuit board, the terminal being electrically connected to each of the plural wiring portions, the terminal being configured to output the imaging signal to an outside of the terminal or receive an external signal from the outside of the terminal; and
    a switch configured to output, by selective switching, at least one of the imaging signal and an internal signal generated at the circuit board, to the terminal.

2. The imaging element according to claim 1, further comprising:
    a switching signal generator configured to generate, based on the external signal, switching signal for switching output of the switch, wherein
    the switch is configured to cause, based on the switching signal, the terminal to output the at least one of the imaging signal and the internal signal.

3. The imaging element according to claim 1, further comprising:
    a separator configured to generate the internal signal by separating the external signal, wherein
    the external signal is one of: a first superimposed signal including a synchronization signal and a clock signal superimposed on each other; and a second superimposed signal including the synchronization signal and a direct current component superimposed on each other, the direct current component being for driving of the light receiver, and
    the separator is configured to
        separate the synchronization signal and the clock signal from the first superimposed signal when the external signal is the first superimposed signal, and
        separate the direct current component and the synchronization signal from the second superimposed signal when the external signal is the second superimposed signal.

4. The imaging element according to claim 3, wherein the switch is configured to cause the terminal to output any one of signals separated by the separator.

5. The imaging element according to claim 3, wherein the switch is configured to
    cause the terminal to output, as the internal signal, at least one of the synchronization signal and the clock signal when the external signal is the first superimposed signal, and
    cause the terminal to output, the internal signal, at least one of the direct current component and the synchronization signal when the external signal is the second superimposed signal.

6. The imaging element according to claim 3, further comprising:
    an amplifier configured to amplify a signal input from the switch and output the amplified signal to the terminal; and
    an adjuster configured to adjust level of an operation range of the amplifier, wherein
    the adjuster is provided between the switch and the separator,
    the adjuster is configured to adjust level of the internal signal input from the separator, and output the adjusted internal signal to the amplifier.

7. The imaging element according to claim 3, further comprising:
a voltage generator configured to generate internal direct current voltage based on power source voltage input from an outside of the voltage generator, wherein
the switch is configured to cause the terminal to output any one of the imaging signal, the internal direct current voltage, and the internal signal.

8. The imaging element according to claim 2, wherein the switch is arranged on at least one of the pixel board and the circuit board.

9. The imaging element according to claim 2, wherein the switch is arranged on each of the pixel board and the circuit board.

10. The imaging element according to claim 2, wherein
the external signal is a synchronization signal for driving of the imaging element, and
the switching signal generator is configured to generate the switching signal based on a pattern embedded in the synchronization signal.

11. The imaging element according to claim 2, wherein
the external signal is power source voltage for driving of the imaging element, and
the switching signal generator is configured to generate the switching signal based on a voltage value of the power source voltage.

12. The imaging element according to claim 2, wherein the switch is configured to
output the internal signal to an outside of the switch when the external signal has been input, and
output the imaging signal to an outside of the switch when the imaging signal has been input.

13. An endoscope, comprising:
the imaging element according to claim 1; and
an insertion portion that is to be inserted into a subject, wherein
the insertion portion includes the imaging element provided at a distal end portion of the insertion portion.

14. An endoscope system, comprising:
the endoscope according to claim 13;
a controller configured to perform image processing on the imaging signal; and
a display configured to display a display image based on the imaging signal that has been subjected to the image processing by the controller.

15. A testing method of an imaging element comprising:
a pixel board including a light receiver arranged on the pixel board, the light receiver including plural pixels that are arranged in a two-dimensional matrix, each pixel being configured to receive light from an outside of the pixel and generate an imaging signal according to quantity of the light received;
a circuit board including a functional circuit with a predetermined function, the pixel board being layered on the circuit board;
plural wiring portions configured to electrically connect the pixel board and the circuit board to each other and electrically transmit signals between respective layers;
a terminal provided on the circuit board, the terminal being electrically connected to each of the plural wiring portions, the terminal being configured to output the imaging signal to an outside of the terminal or receive an external signal from the outside of the terminal; and
a switch configured to output, by selective switching, at least one of the imaging signal and an internal signal generated at the circuit board, to the terminal, the testing method comprising:
inputting at least a synchronization signal to the imaging element; and
determining a defective part of the imaging element based on the imaging signal and the internal signal output from the imaging element.

* * * * *